United States Patent [19]
Hoshi et al.

[11] Patent Number: 6,074,175
[45] Date of Patent: Jun. 13, 2000

[54] FUEL PUMP

[75] Inventors: Yoshikazu Hoshi, Tokai-mura; Hideki Machimura, Hitachinaka, both of Japan

[73] Assignees: Hitachi, Ltd., Tokyo; Hitachi Car Engineering Co. Ltd., Hitachinaka, both of Japan

[21] Appl. No.: 09/283,276

[22] Filed: Apr. 1, 1999

Related U.S. Application Data

[62] Division of application No. 08/733,323, Oct. 17, 1996.

[30] Foreign Application Priority Data

Oct. 19, 1995 [JP] Japan .................. 7-270880

[51] Int. Cl.[7] ............................................. F04B 1/12
[52] U.S. Cl. ................................................. 417/269
[58] Field of Search ...................................... 417/269

[56] References Cited

U.S. PATENT DOCUMENTS

| | | | |
|---|---|---|---|
| 2,519,893 | 8/1950 | Deschamps | 103/173 |
| 2,809,868 | 10/1957 | Thompson | 299/107.2 X |
| 4,321,019 | 3/1982 | Degawa et al. | 417/269 |
| 4,550,630 | 11/1985 | Remus | 74/800 |
| 4,893,993 | 1/1990 | Shimizu | 417/269 |
| 5,051,067 | 9/1991 | Terauchi | 417/222 R |
| 5,137,431 | 8/1992 | Kiyoshi et al. | 417/269 |
| 5,172,623 | 12/1992 | Poisson | 91/46 |
| 5,391,058 | 2/1995 | Goto et al. | 417/223 |
| 5,782,161 | 7/1998 | Okubo | 92/71 X |

FOREIGN PATENT DOCUMENTS

9-184476   7/1997   Japan .................. 417/269

*Primary Examiner*—Charles G. Freay
*Assistant Examiner*—Ehud Gartenberg
*Attorney, Agent, or Firm*—Evenson Mckeown Edwards & Lenahan P.L.L.C.

[57] ABSTRACT

A motion converting mechanism for converting the rotating motion to the inclined gyration movement in a fuel pump is isolated from gasoline through a flexible isolating member. The lubrication of a load supporting portion in the fuel pump, which is enclosed in an interior portion of the flexible isolating member, can be performed. A sealing portion of a rotating shaft in the fuel pump is isolated from the gasoline by the flexible isolating member. The lubricating oil is sealed in an interior portion of an isolating area formed by the flexible isolating member.

2 Claims, 7 Drawing Sheets

FUEL PUMP

This application is a division of application Ser. No. 08/733,323, filed Oct. 17, 1996.

BACKGROUND OF THE INVENTION

The present invention relates to a fuel pump and in particularly to a gasoline use fuel pump suitable for an in-cylinder direct injection system used for in an internal combustion engine.

In an internal combustion engine, in particular in a gasoline internal combustion engine for use in an automobile, from aspects of an improvement of fuel consumption property, a reduction of harmful exhaust gas and an improvement of driveability (a response for a drive condition changing) etc. of the automobile, in recently a practical application about an in-cylinder direct injection system used in an internal combustion engine is seriously studied.

In the in-cylinder direct injection system of the gasoline internal combustion engine, a fuel delivery source is indispensable to directly inject the gasoline into a cylinder of the gasoline internal combustion engine. Since the gasoline injection into the cylinder requires to carry out even during a compressing period of the engine, from the above stated fuel delivery source, it is necessary to delivery the fuel having a high pressure of some 30–100 kg/cm².

The gasoline to be delivered has an extremely small viscosity property and also has an inferior lubrication property in comparison with general use oil such as engine oil.

As a result, since the leakage of the gasoline from a compressing part is large and it is difficult to compress the gasoline at a high pressure, a lubrication property in a load supporting member (for example, a bearing member) for necessarily constituting a fuel pump construction is injured.

At the present time, it is a problem wherein the bearing member enable to use one having the sufficient life time can not be expected under the gasoline environment.

Further, in a sealing member of a rotative shaft for necessarily constituting the fuel pump construction, at the present time, it is extremely difficult to expect the sufficient reliability property of the sealing member under the gasoline environment.

From the above stated circumferences, a fuel pump as a prior art is disclosed in, for example, Japanese patent laid-open publication No. 209,981/1992.

In this conventional fuel pump construction, concerning the above stated problems about the low gasoline viscosity property and the difficult compression to the high pressure, following problems for realizing the fuel pump are solved.

Namely, in the above stated conventional fuel pump construction using the secondary fluid having the high viscosity and the high lubrication property, an ascend pressure in the fluid is easily performed.

The gasoline being an objective material is raised in pressure through a pressure transfer member (in this case, a bellows) and in addition to the above the lubrication in the load supporting member such as a bearing member is performed using the secondary fluid. Further, the secondary fluid becomes a sealing objective matter for sealing a rotative shaft.

However, in the above stated conventional fuel pump construction, since the pressure transfer member is necessary to provide every compressing cylinder of the fuel pump each, a number of components increases. Further, from a structural aspect in case of an employment of a multi-cylinder structure, since the above stated apparatuses are necessary to arrange toward an axial direction, therefore it causes a problem where an axial direction dimension of the fuel pump construction increases.

In the above stated in-cylinder direct injection system for use in the internal combustion engine, from aspects of the volume control accuracy of the injection fuel, the response for control, the security of a degree of freedom in an injection timing optimization, it is desirable to electronically perform a control of an injector. To serve the above purpose, it requires a small fluctuation of a delivery fuel pressure.

Accordingly, it is desirable to provide a large number of the compressing cylinders and in case of the multi-cylinder structure it is desirable to realize a compact size fuel pump structure.

SUMMARY OF THE INVENTION

An object of the present invention is to provide a fuel pump wherein a compact size and a multi-cylinder type fuel pump can be realized.

Another object of the present invention is to provide a fuel pump wherein lubrication property of a load supporting member for indispensably constituting a fuel pump structure can be improved.

A further object of the present invention is to provide a fuel pump wherein reliability property in a sealing structure for a rotative shaft can be heightened.

A further object of the present invention is to provide a fuel pump wherein a lowering phenomenon of volume efficiency caused from low viscosity in fuel such as a gasoline can be fully covered by utilizing a merit suitable for a compact size and a multi-cylinder type fuel pump structure.

A further object of the present invention is to provide a fuel pump wherein an increase of design discharge flow amount of the fuel can be attained. According to the present invention, a fuel pump comprises a rotative shaft driven by a rotation of an internal combustion engine and a swash plate mounted on the rotative shaft in which a rotating motion of the rotative shaft is converted by an axial inclined gyration moving and fuel is pressurized and compressed to raise in pressure accordance with of an axial direction motion component of the swash plate. A rotating motion converting mechanism for converting the rotating motion of the rotative shaft to the axial inclined gyration moving is isolated through a flexible isolating member.

According to the present invention, a fuel pump comprises a rotative shaft for transmitting rotation from an outside, a swash plate fixed on one end of the rotative shaft and for rotating together the rotative shaft and having a different normal direction face from an axial direction of the rotative shaft, plural pressurizing chambers for pressurizing fuel, and a rotating motion converting portion for converting a rotating motion of the rotative shaft to a reciprocating motion of the swash plate and for transmitting the reciprocating motion to the pressurizing chamber. The rotating motion converting portion is isolated through a flexible isolating member.

According to the present invention, a fuel pump comprises a rotative shaft for transmitting rotation from an outside, a swash plate fixed on one end of the rotative shaft and for rotating together the rotative shaft and having a different normal direction face from an axial direction of the rotative shaft, plural pressurizing chambers for pressurizing fuel, and a rotating motion converting portion for converting a rotating motion of the rotative shaft to a reciprocating motion of the swash plate and for transmitting the reciprocating motion to the pressurizing chamber A sliding and contacting portion formed between the swash plate and the rotating motion converting portion and the swash plate are isolated through a flexible isolating member.

According to the present invention, a fuel pump comprises a body, a rotating shaft penetrating mounted on the body, a swash plate member provided on an interior portion of the body and mounted on one end of the rotating shaft, a motion converting portion for converting a rotating motion of the rotating shaft to an inclined gyration moving, a pump mechanism portion opposite arranged to the swash plate member and having plural pistons which slide and contact to the swash plate member, a first fluid section for receiving a first fluid which is pressurized according to an axial direction motion by the swash plate member, and a second fluid section adjacently provided on the first fluid section and for receiving a second fluid, and the second fluid section for including the motion converting portion, viscosity of the second fluid in the second fluid section is larger than viscosity of the first fluid in the first fluid section According to the present invention, a fuel pump comprises, a body having an opening portion at one end, a rotating shaft penetrating mounted on the body, a swash plate member provided on an interior portion of the body and mounted on one end of the rotating shaft, a motion converting portion for converting a rotating motion of the rotating shaft to an inclined gyration moving, a pump mechanism portion provided on the opening portion of the body and opposite arranged to the swash plate member, and the pump mechanism portion having plural pistons which slide and contact to the swash plate member, a first fluid section provided on a side of the pump mechanism portion and for receiving a first fluid which is pressurized according to an axial direction motion by the swash plate member, and a second fluid section adjacently provided on the first fluid section and for receiving a second fluid, and the second fluid section for including the motion converting portion, viscosity of the second fluid in the second fluid section is larger than viscosity of the first fluid in the first fluid section.

According to the present invention, a fuel pump comprises a body having an opening portion at one end, a rotating shaft penetrating mounted on the body; a swash plate member provided on an interior portion of the body and mounted on one end of the rotating shaft, a motion converting portion for converting a rotating motion of the rotating shaft to an inclined gyration moving, a pump mechanism portion provided on the opening portion of the body and opposite arranged to the swash plate member, and the pump mechanism portion having plural pistons which slide and contact to the swash plate member, a flexible isolating member provided in the interior portion of the body, a first fluid section provided on a side of the pump mechanism portion and isolated by the flexible isolating member, and the first fluid section for receiving a first fluid which is pressurized according to an axial direction motion by the swash plate member, and a second fluid section adjacently provided on the first fluid section and isolated by the flexible isolating member, and the second fluid section for receiving a second fluid and for including the motion converting portion, viscosity of the second fluid in the second fluid section is larger than viscosity of the first fluid in the first fluid section.

The basic means for solving the problems in the present invention is that the motion converting portion for giving the reciprocating motion of the pump compressing portion is enclosed by the flexible isolating member. Further another means in the present invention is that the lubricating oil is enclosed in the flexible isolating member.

In the present invention, the basic system of the fuel pump has the swash plate system and this swash plate system is suitable to form the small size and the multi-cylinder type fuel pump.

In the present invention, to the swash plate only the inclined gyration moving causes. And selectively, the rotating motion preventing member is provided on the swash plate, thereby the rotation force acted on the flexible isolating member is positively dissolved.

Further, the rotation direction strength of the flexible isolating member is fully processed, therefore the above stated rotating motion preventing member is unnecessary and as a result the number of the pump components are deleted.

The end portion of the flexible isolating member is formed to selectively cause the eccentric inclined gyration moving and the stress easing generated on the flexible isolating member is attained.

In the present invention, the connecting portion for observing the pressure in the interior portion of the flexible isolating member is provided and the abnormality of the flexible isolating member is detected.

DESCRIPTION OF THE INVENTION

Hereinafter, one embodiment of a fuel pump according to the present invention will be explained referring to drawings.

Figure 1:
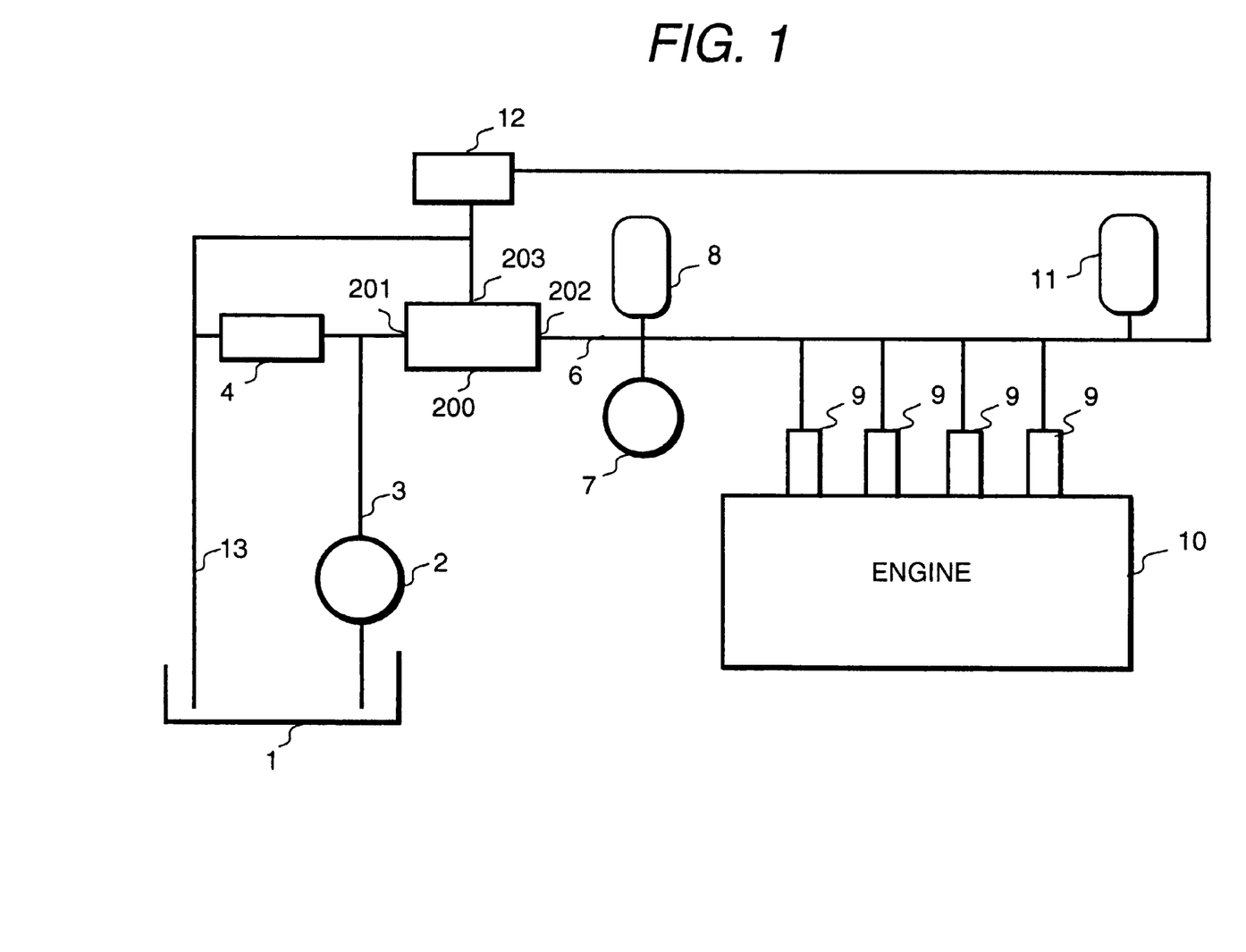
FIG. 1 is a block diagram showing a construction of an in-cylinder direct injection system for use in an internal combustion engine in which one embodiment of a fuel pump according to the present invention is applied.

FIG. 1 is a block diagram showing a construction of an in-cylinder direct injection system for use in an internal combustion engine in which one embodiment of a fuel pump according to the present invention is applied.

In an in-cylinder direct injection system for use in an internal combustion engine, a low pressure fuel pump 2 is installed in a fuel tank 1. The fuel tank 1 is mounted on a vehicle such as an automobile and the low pressure fuel pump 2 is ordinary driven by an electric motor.

The low pressure fuel pump 2 sucks and pressurizes the fuel received in the fuel tank 1 and the fuel is sent out from a low pressure fuel delivery piping 3.

A known low pressure regulator 4 is connected to the low pressure fuel delivery piping 3. This low pressure regulator 4 operates the pressure to a low pressure fuel delivery piping portion constant and returns superfluous fuel through a fuel return piping 13 to the fuel tank 1. A pressure value of the fuel in the low pressure fuel delivery piping portion is 3 kg/cm² degree.

A fuel delivery portion 201 of a high pressure fuel pump 200 is connected to the low pressure fuel delivery piping 3. As the high pressure fuel pump 200, a fuel pump construction according to the present invention is applied. A high pressure fuel delivery piping 6 is connected to a fuel outlet portion 202 of the high pressure fuel pump 200.

On the high pressure fuel delivery piping 6, an upstream accumulator 8 and a downstream accumulator 11 are selectively provided to reduce the fluctuation in pressure. A pressure sensor 7 is selectively provided on the high pressure fuel delivery piping 6 to detect an actual value of the pressure.

Plural injectors 9 are connected to the high pressure fuel delivery piping 6 and these injectors 9 are installed to the engine 10 and controls the fuel injection amount by the respective injector 9.

Further, the high pressure fuel delivery piping 6 is connected to a high pressure regulator 12 at a downstream side of the high pressure fuel delivery piping 6. The high pressure regulator 12 controls the pressure in the high pressure fuel delivery piping 6 constant and the superfluous fuel is discharged to the fuel return piping 13.

A fuel relief portion 203 is selectively provided on the high pressure fuel pump 200 and this fuel relief portion 203 operates to return the fuel in the high pressure fuel pump 200 toward the fuel return piping 13 in the event of necessity. As a result, the fuel pressure in the high pressure fuel delivery piping 6 is substantially maintained at constant.

Figure 2:
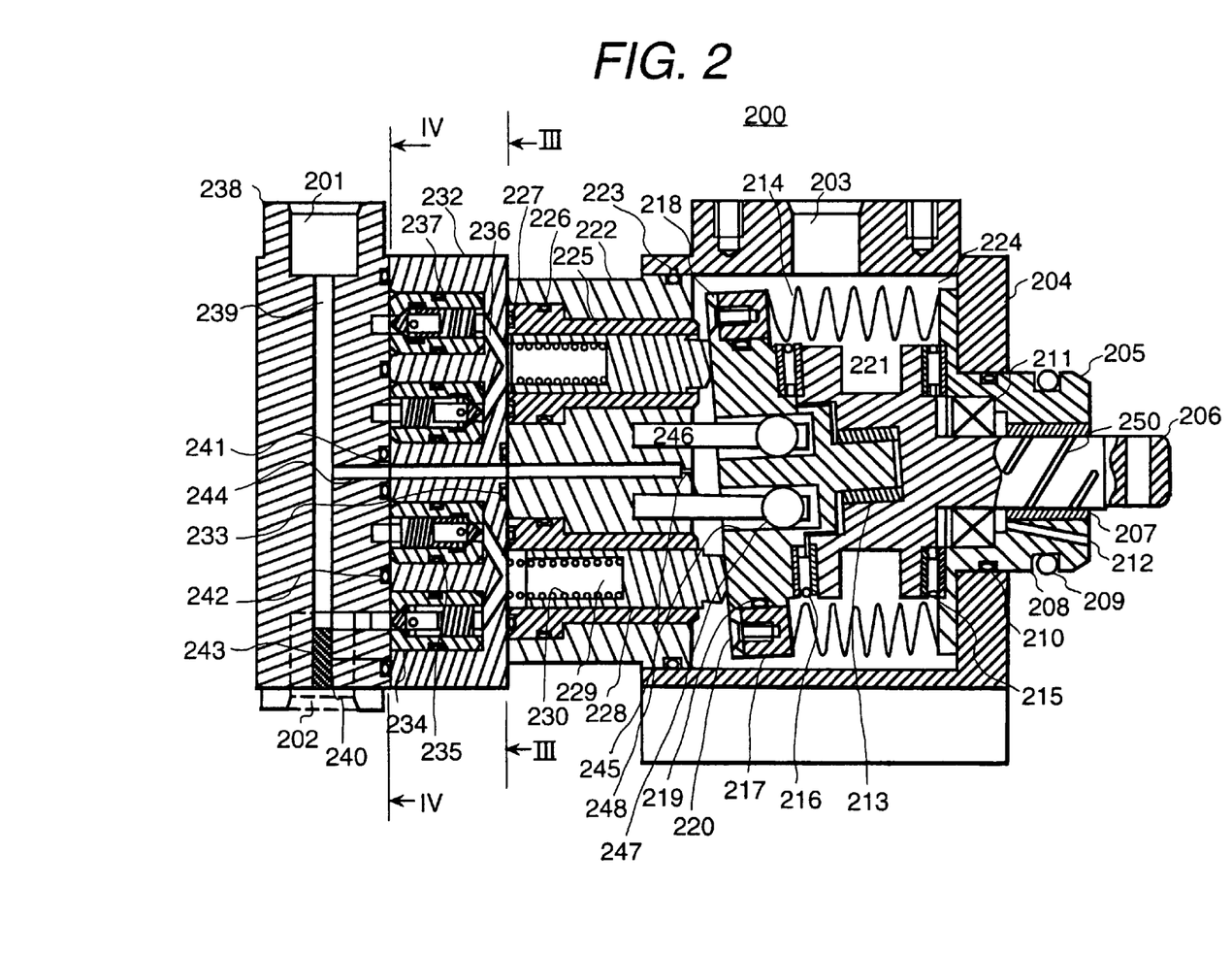
FIG. 2 is a cross-sectional view showing one embodiment of a fuel pump according to the present invention.

One embodiment of the fuel pump as the high pressure fuel pump 200 illustrated in FIG. 2 according to the present invention will be explained. FIG. 2 is a cross-sectional view showing one embodiment of the fuel pump according to the present invention.

In the high pressure fuel pump 200, a rotative shaft 206 is connected to and driven by a driving shaft of the engine 10, such as a cum shaft of intake and/or exhaust valves, through a suitable connecting tool. The rotative shaft 206 is installed through a body 204 at a suitable position of the engine 10.

The above stated fuel relief portion 203 is provided on the body 204 with a hole form, preferably the fuel relief portion 203 is provided on at an upper portion of the body 204. The above stated fuel return piping 13 is connected to a hole portion formed on the fuel relief portion 203 through a connecting tool (not shown). In case when the fuel relief portion 203 is formed with a flange shape, the fuel relief portion 203 is fixed to an installing screw hole using a connecting tool.

A thrust force toward a right direction on the rotative shaft 206 is supported through a bearing member 215 and a radial force on the rotative shaft 206 is supported by through a bearing member 207. These two bearing members 215 and 207 are supported by a driving and supporting portion 205 which is inserted with pressure to the body 204.

A sealing member 210 is mounted between the body 204 and the driving and supporting portion 205 and prevents a leakage of fluid from a clearance formed between the body 204 and the driving and supporting portion 205.

A circular groove 208 is provided at a vicinity of a right end portion of the driving and supporting portion 205 and has a sealing member 209 therein. The sealing member 209 engages with a cylindrical fixing portion for surrounding a driving shaft portion of the engine 10 and prevents the leakage of the lubricating oil from the groove portion.

An oil induction groove 250 is provided on a surface of the rotative shaft 206 and takes into the lubricating oil which is included in the right portion of an driving and supporting portion 205. A lubricating oil sealing member 211 is inserted with pressure to the driving and supporting portion 205 and prevents the leakage of the fluid existing at the right side.

The oil taken into the lubricating oil sealing member 211 gives a lubricating effect to the lubricating oil sealing member 211 and the surface of the rotating shaft 206. An oil return hole 212 is provided on the body 204 to return the superfluous oil.

A left end portion of the rotative shaft 206 has an inclined shape against a right angle cross-section of the rotative shaft 206. A swash plate thrust bearing member 216 is provided on the left end portion of the rotative shaft 206. Further, a swash plate 218 is provided at a left side of the swash plate thrust bearing member 216.

A hole and a swash plate bearing member 213 mounted in the hole are provided at an interior portion of the rotative shaft 206. The above hole is inclined against the center axis of the rotative shaft 206. The swash plate bearing member 213 engages with the right end portion of the swash plate 218 and supports a radial force of the swash plate 218. A fixing force for engaging with the swash plate 218 toward the left direction is given by the plungers 228 as stated in a latter portion.

With the constitution stated in above, paying an attention to the rotative shaft 206, the right side of the rotative shaft 206 is supported by the bearing member 215 and at the left side of the rotative shaft 206 the rotating motion of the rotative shaft 206 with the swash plate 218 is shielded by the swash plate thrust bearing member 213.

Therefore, the rotative shaft 206 can freely rotate and from an aspect of another viewpoint the swash plate 218 is not perform the rotating motion but performs an inclined gyration moving where an inclination direction of the center axis of the swash plate 218 rotates.

A flexible isolating member 214 is fixed to the left side of the driving and supporting portion 205 by a welding manner, for example. A finish end portion 217 of the flexible isolating member 214 is fixed to another end of the flexible isolating member 214 by a welding manner, for example.

The finish end portion 217 of the flexible isolating member 214 is tight-sealed fixed against the swash plate 218 by cooperating the sealing member 219 and further is fixed by a fixing member 220.

A rotating motion converting mechanism for converting from the rotating motion to the inclined gyration moving of the swash plate 218 includes the oil sealing member 211, the bearing members 215 and 216, the rotative shaft 208, and the swash plate bearing member 213. As a result, this rotating motion converting mechanism has an isolating section 221 which is isolated from other components.

A pressuring body 222 is installed with an oil-sealed form to the body 204 by cooperating with the sealing member 223. A sleeve 225 for forming a fuel pressurizing chamber is oil-sealed installed by intervening a sleeve side face of a sealing member 226 at an outer peripheral portion and a sleeve bottom face sealing member 227 at a bottom face portion.

A fuel relief section 224 is formed an outside of the flexible isolating member 214. In other words, the isolating section 221 and the fuel relief section are divided by the flexible isolating member 214.

The plunger 228 is installed free-sliding at the right and left direction in an interior portion of the sleeve 225. A spring member holding portion 229 is formed on the left end portion of the plunger 228 and receives the force of a spring member 230 and further operates forcibly the plunger 228 toward the right direction.

A check body 232 is contacted to the left end portion of the pressuring body 222. Plural intake check valves 234 are included at an outer peripheral portion side of the interior portion of the check body 232 and allow to flow the fuel into the plunger 228.

Plural outlet check valves 235 are included at an inner peripheral portion side of the interior portion of the check body 232 and allow to flow the fuel out the plunger 228.

A detail of one relationship embodiment of the above both intake and outlet check valves 234 and 235 will be explained in a latter portion referring to FIG. 8. To oil-sealed installation of the both intake and outlet check valves 234 and 235, the check valve sealing members 237 are installed to the outer peripheral portions of the intake and outlet check valves 234 and 235.

Figure 3:
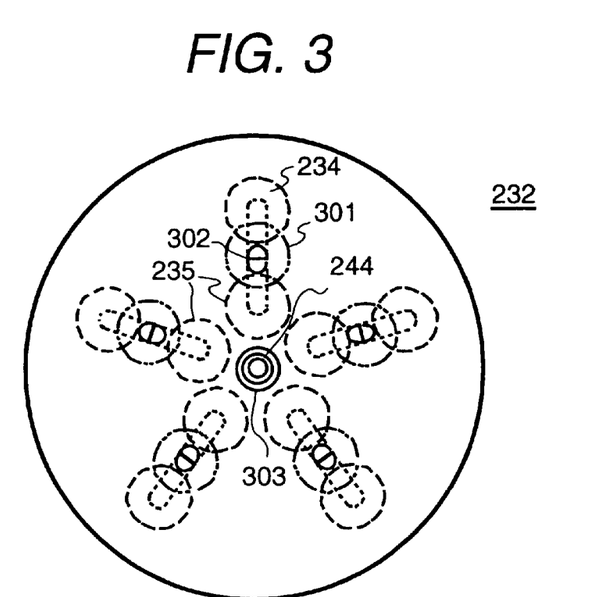
FIG. 3 is a plan view showing the fuel pump taking along a line III—III of FIG. 2.

FIG. 3 is a cross-sectional view of the check body 232 taken along a line III—III of FIG. 2. Referring to FIGS. 2 and 3, a structure of the check body 232 will be clearly explained in detail.

A fuel delivery hole 244 is provided on a central portion of the check body 232 and a right side sealing groove 303 of the check body 232 for receiving a central sealing member 233 is provided at an outer peripheral side of the fuel delivery hole 244.

A place for contacting the outlet check valve 235 is shown with a dot line at the outer peripheral portion of the check body 232 and further at the most outer peripheral portion a place for contacting the intake check valve 234 is shown with a dot line.

At the central portion of both intake and outlet check valves 234 and 235, a place 301 for arranging the plunger 228 is shown with a two-dot chain line on the pressurization body 222.

The intake check valve 234, the outlet check valve 235 and the plunger 228 are formed with plural sets, the structure shown in figures corresponds to a formation of a five-cylinder axial plunger pump. At a plunger arrangement portion, a check hole opening portion is provided and a hole 302 for communicating to the intake check valve 234 and the outlet check valve 235 are formed from a lower portion of the plunger 228.

An end portion body 238 is contacted to at the left side of the check body 232. The check body 232 and the pressuring body 222 are fastened and fixed to the end portion of the body 238 using a through-bolt.

Figure 4:
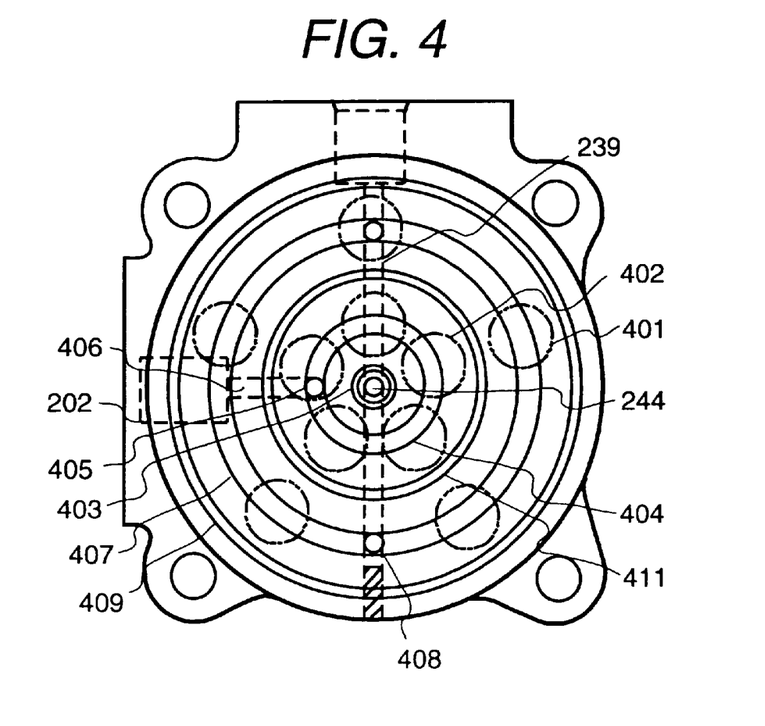
FIG. 4 is a plan view showing the fuel pump taking along a line IV—IV of FIG. 2.

FIG. 4 is the end portion body 238 taken along a line IV—IV of FIG. 2. Referring to FIGS. 2 and 4, the structure of the end portion body 238 will clearly explained in detail.

The fuel delivering portion 201 is provided on the end portion body 238 similarly to with a manner shown in the above stated fuel relief portion 203. An intake hole 239 is formed by boring to penetrate through across the central portion of the rotative shaft 206 and the most remote end portion of the intake hole 239 is sealed by a plug 240.

A fuel delivery hole 244 for communicating the intake hole 239 is provided at a central portion of the end portion body 238 and communicates to a central hole of the above stated check body 232 and a central hole of the pressurizing hole 222. An orifice 245 is selectively provided on an exit portion of the central hole of the pressurizing body 222.

The fuel delivery hole 244 is provided on the central portion of the end portion body 238. A central sealing groove 403 is provided at an outer peripheral portion of the fuel delivery hole 244 and receives a central sealing member 241. A fuel outlet circular ring form groove 404 is provided at an outer peripheral portion of the central sealing groove 403.

The position of the above stated fuel outlet circular groove 404 is shown in an outlet check valve arrangement portion 402 which is indicated by a two-dot chain line of FIG. 4. An outlet opening portion of the above stated outlet check valve 235 is formed to communicate to the fuel outlet circular groove 404.

An intermediate sealing groove 411 for receiving an intermediate sealing member 242 is provided at an outer peripheral portion of the outlet circular groove 404.

A fuel delivery circular groove 407 is provided at an outer peripheral portion of the intermediate sealing groove 411. The position of the fuel delivery circular groove 407 is shown in an intake check valve arrangement portion 401 which is indicated by a two-dot chain line of FIG. 4. The fuel delivery circular groove 407 is formed to communicate to a left end side opening portion of the intake check valve 234.

As shown in FIG. 4, a fuel outlet portion 202 is provided at the left end portion of the end portion body 238. An outlet vertical hole 406 for communicating to the fuel outlet portion 202 is provided on the fuel outlet portion 202 and an outlet horizontal hole 405 for communicating to the fuel outlet circular groove 404 is provided. In other words, the fuel outlet circular groove 404 communicates to the fuel outlet portion 202 each other.

Similarly to the above, the intake hole 239 and the fuel delivery circular groove 407 are communicated with one or plural fuel delivery vertical hole 408, therefore the fuel delivery portion 201 communicates to the fuel delivery circular groove 407.

An outer circular sealing groove 409 is provided at the most outer peripheral portion of the end portion body 238 and receives an outer circular sealing member 243.

A rotation fixing shaft 246 is provided on the pressurizing body 222 and a hole machined ball 247 is engaged free-sliding to the rotation fixing shaft 246.

Plural ball receiving holes 248 are provided on the swash plate 218 toward a right angle direction of the end surface of the rotative shaft 206 and engage with the above stated hole machined ball 247. A necessary and sufficient number of the plural ball receiving holes 248 is three.

A component group, which is comprised of the rotation fixing shaft 246, the hole machined balls 247 and the plural ball receiving holes 248, is acted on as a rotating motion preventing member for regulating the rotating motion of the swash plate 218 and the detailed rotating motion preventing member will be explained in a latter portion.

In the present invention, the swash plate 218 is defined by using name of the swash plate, however the figure of the swash plate 218 itself is a parallel shape rotating member and the swash plate 218 is used under the inclined state against the rotating shaft 206.

An action and an operation of one embodiment of the fuel pump explained by the structure shown in FIG. 1 to FIG. 4 according to the present invention will be explained.

The low pressure fuel supplied from the low pressure fuel delivery piping 3 is connected to the fuel delivery portion 201 of the fuel pump and reaches to the fuel delivery circular groove 407 through the intake hole 239 and the fuel delivery vertical hole 408.

After that the fuel pushes the intake check valve 234 open and reaches to the lower portion of the plunger 228. In case where the plunger 228 leaves a room toward the right direction, then the fuel performs to move the plunger 228.

The spring member 230 is received at the lower portion of the plunger 228. A spring force by the spring member 230 moves the plunger 228 and sucks the fuel, therefore the plunger 228 is moved toward the right direction. A head portion of the right side of the plunger 228 is formed with a spherical shape and contacts to the swash plate 218.

As stated in above, the left end portion of the rotative shaft 206 is inclined against the right angle cross-section of the rotative shaft 206 and the rotating motion of the inclined face of the rotative shaft 206 is transmitted to the swash plate 218 through the swash plate thrust bearing member 216.

Therefore, the swash plate 218 does not perform the rotating motion but causes the inclined gyration moving in which the center axis of the swash plate 218 is inclined. Since the head portion of the plunger 228 is contacted to the left end portion of the swash plate 218, at the head portion of the plunger 228 the swash plate 218 causes a reciprocating motion toward the left and right direction.

In the reciprocating motion of the swash plate 218, the motion toward the right direction makes an intake process and as stated in above this right direction motion operates to fill up the fuel at the fuel pressurizing section which is formed at the lower portion of the plunger 228.

The motion toward the left direction of the plunger 228 makes a compressing process and the fuel at the fuel pressurizing section portion 231 is pressurized and arisen in pressure. The pressurized fuel pushes a poppet valve of the outlet check valve 235 open through the check hole 236.

After that the fuel reaches to the fuel outlet circular groove 404 and is discharged from the fuel outlet portion 202 to the high pressure fuel delivery piping 6.

At this time, the pressurized fuel is led to the intake check valve 234 through the check hole 236, however at the intake check valve 234 since the pressure operates to a closing direction of the poppet valve, the relief of the fuel is prevented.

The fuel having the pressure at the fuel outlet circular groove 404 is sealed by the central sealing member 241 and the intermediate sealing member 242 and so that the leakage of the fuel to other portions is prevented.

Similarly to the fuel having the pressure at the fuel outlet circular groove 407 is sealed by the intermediate sealing member 242 and the outer circular groove 243 and so that the leakage of the fuel to other portions is prevented.

In this embodiment according to the present invention, the intake check valve 234 is arranged at the outer peripheral portion of the outlet check valve 235. So that an area surrounded by the outer circular groove 244 and the intermediate sealing member 242 is larger than an area surrounded by the intermediate sealing member 242 and the central sealing member 241. The fuel having the low pressure is acted on the larger section side, therefore an axial direction separating force due to the fuel is made small.

The fuel being led from the fuel delivery portion 201 has the pressure of 3 kg/cm$^2$ degree as stated in above. So that the fuel vapors do not generate even in case where the fuel exists on a high temperature atmosphere at a vicinity of the engine 10. Further, the cavitation does not generate even in case where the fuel pump exists under the intake process of the fuel pump. Therefore the force feeding ability of the fuel pump can be fully obtained.

Since the above fuel is discharged to a right side section of the orifice 245 through the orifice 245, the fuel is made fully at the low pressure, desirably under the pump operating condition the fuel is returned to the fuel tank 1 through the fuel return piping 13 from the fuel relief portion 203 which is provided toward an upper direction.

Since the swash plate 218 does not perform the rotating motion but performs only the inclined gyration moving, a relative sliding distance between the swash plate 218 and the plunger 228 is small. In other words, under the complete drying condition there is a possibility about an occurrence of a problem in wear etc.

However, a sliding portion formed between the swash plate 218 and the plunger 228 is enclosed by the fuel having the low pressure, the above stated problem can be reduced.

Since the rotating motion converting mechanism for converting the rotating motion of the rotative shaft 206 to the inclined gyration moving of the swash plate 218 is isolated from the other components by the flexible isolating member 214, the gasoline does not flow into the rotating motion converting mechanism.

As a result, a portion comprised of the bearing members 215, 216 and 213, which are included in the rotating motion converting mechanism, and the oil sealing member are isolated from the gasoline, and according to circumstance the grease member can use.

In the isolating section 221, the lubricating oil (for example, engine oil, synthetic oil etc.) can be enclosed therein. With the above stated construction, the lubricating property in the load supporting portion (for example, bearing member) can hold.

In the interior portion of the isolating section 221, the rotative shaft 206 rotates and the lubricating oil is agitated, however a change in an entire volume of the lubricating oil does not cause. Accordingly, the lubricating oil can be fill up almost portion of the isolating section 221.

Since originally the isolating section 221 does not contact to an outside fresh air, an oxidation inferior in the lubricating oil hardly cause. Further, since an air part is reduced by increasing a fill-up amount of the lubricating oil, the oxidation inferior can be further reduced.

Further, by filling up the isolating section 221 using an inert gas or by evacuating the isolating section 221, the reduction about the oxidation inferior can be heightened, therefore rotating motion converting mechanism having a high reliability property can be obtained.

In the above embodiment of the present invention, a number of the plunger 228 is five and five plungers 228 are arranged with a same angle interval at a surrounding portion of the rotative shaft 206 of the fuel pump 200. Since the compressing process is performed with the swash plate 218 by successively changing a phase, a multiple fuel discharge is carried out.

For the in-cylinder direct injection system having the small fluctuation, a suitable fuel discharge is carried out. To reduce the fuel discharge amount fluctuation, a multi-cylinder fuel pump is indispensable and a subject matter is to realize the fuel pump having a compact size and a high reliability property.

From the above stated aspects, an axial plunger fuel pump is most desirable, such an axial plunger arranges plural pressurizing plungers at an axial direction.

A fuel pump having the desirable properties can be realized by combining the above stated system fuel pump to the above stated rotating motion converting mechanism having the high reliability property.

In the embodiment of the fuel pump according to the present invention, in the compressing mechanism portion the gasoline is directly pressurized, the leakage causes at any cost from the compressing portion due to the low viscosity gasoline and the volume effect fails down.

However, using the rotating motion converting mechanism having the high reliability property in stated in above, for example, to make long a little the reciprocation stroke of the plunger, the lowering portion in the flow amount is easily covered.

Now, the rotating motion preventing member will be explained as following. This technique is shown in U.S. Pat. No. 5,129,797.

Figure 5:
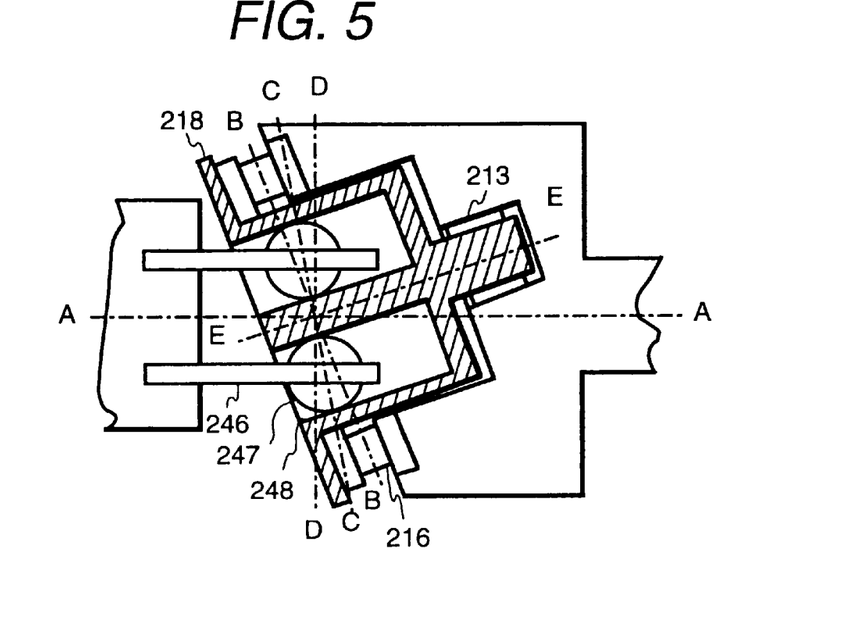
FIG. 5 is a cross-sectional view showing one embodiment of a rotating motion preventing mechanism of a fuel pump according to the present invention.

FIG. 5 is one example of the rotating motion preventing mechanism of the fuel pump. In FIG. 5, A—A line shows the rotation center of the rotative shaft 206, B—B line shows the rotation plan of the swash plate thrust bearing member 216 at a certain moment, C—C line shows a ball alignment plane at such above certain moment, D—D line shows the rotation cross-section of the rotative shaft 206, and E—E line shows the supporting center axis of the swash plate 218 at such above certain moment.

In this rotating motion preventing member, the hole machined ball 247 is engaged with the outer peripheral portion of the rotation fixing shaft 246 and essentially the hole machined ball 247 can freely slide at the right and left direction of the rotation fixing shaft 246.

By constituting three sets comprised of the rotation fixing shaft 246, the hole machined ball 247, and the ball receiving hole 248 provided on the swash plate 218, a necessary number is satisfied and it is desirable from an economical aspect.

In this embodiment illustrated in FIG. 5, the center point of the bearing member 216 in a line A—A face and a line B—B face and the center point of the ball alignment plane cross at one point. The center of the bearing member 216 does not move but only the axial inclined gyration moving causes.

At this time, to position the hole machined ball 247 at an intermediate plan between the line B—B face and the line D—D face, the hole machined ball 247 slides on the rotation fixing shaft 247 and the ball receiving hole 248. The above stated relationship allows to only the axial inclined gyration moving by fixing the rotation of the swash plate 218 in case where the rotation fixing shaft 246 is fixed.

Figure 6:
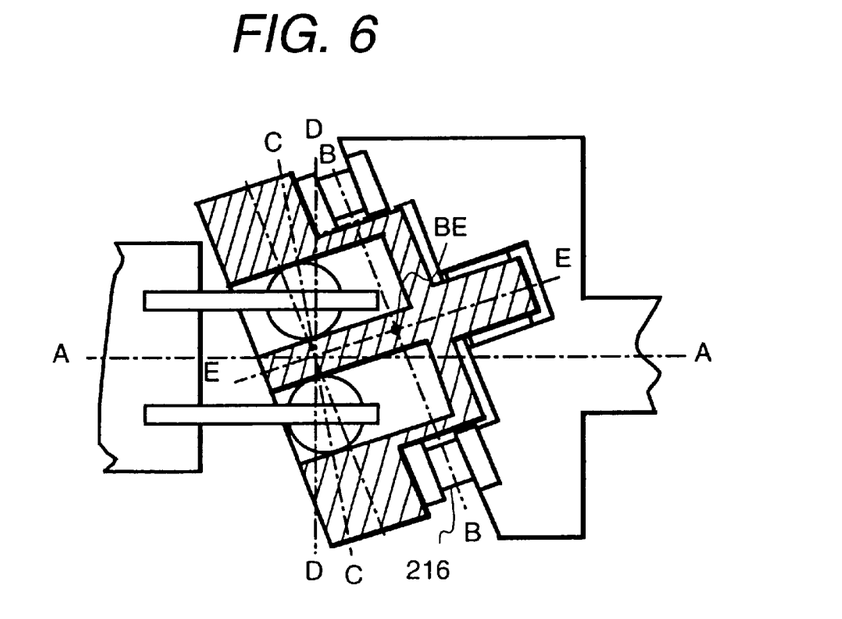
FIG. 6 is a cross-sectional view showing another embodiment of a rotating motion preventing mechanism of a fuel pump according to the present invention.

FIG. 6 shows another example of the rotating motion preventing member of the fuel pump. In FIG. 6, the same parts shown in FIG. 5 are indicated by the same reference numbers of FIG. 5.

The different structure point of FIG. 6 compared with the structure shown in FIG. 5 is as following. The rotation plan of the bearing member 216 is moved toward the left direction from the intersecting point of the line A—A and the line B—B.

Since the center of the bearing member 216 is necessary to position an inclination axis E—E, as shown in a point BE, since the center of the bearing member 216 is positioned at a remote one separated from the center axis A—A of the rotative shaft 206, a whole bearing member performs an eccentric rotating motion. Such an eccentric rotating motion causes to burden an excess load on the bearing member 216, so that the above stated eccentric rotating motion is undesirable.

Therefore, it is desirable to apply the structure shown in FIG. 5. A further study will be explained by returning to FIG. 5.

Paying an attention to a left end face of the swash plate 218, an intersecting point between the swash plate 218 and the line and an axis E—E of the swash plate 218 positions at the lower portion from the center axis A—A of the rotative shaft 206. Supposing that in case where an attention face positions at the right side from the line B—B, the above intersecting point will position at the upper portion side from the center axis A—A.

The above phenomenon causes naturally at the outer peripheral portion of the swash plate 218 and the eccentric motion causes. An eccentric direction and an eccentric amount change in accordance with the position on the axis E—E. The above stated phenomenon can utilize as following.

Figure 7A:
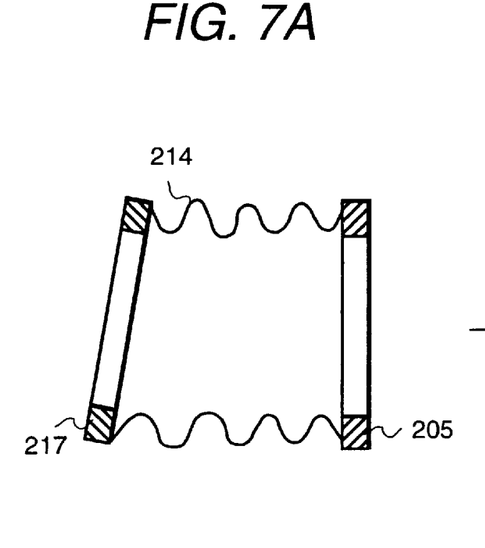
FIG. 7A is a cross-sectional view showing a modified mode of a flexible isolating member of a fuel pump where the flexible isolating member performs an inclined gyration moving without no eccentricity.
Figure 7B:
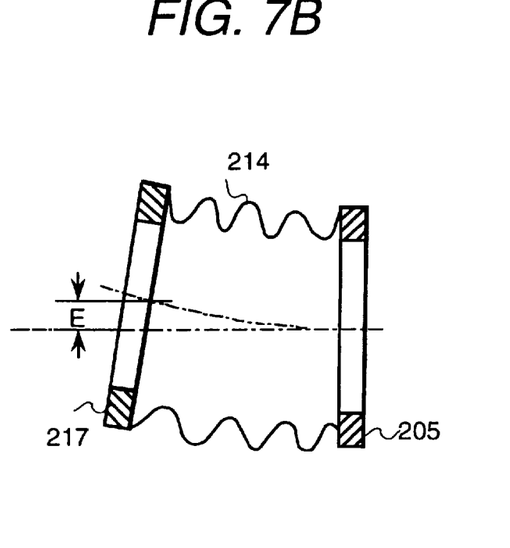
FIG. 7B is a cross-sectional view showing a modified mode of a flexible isolating member of a fuel pump where the flexible isolating member performs an inclined gyration moving having an eccentric amount.

FIG. 7A and FIG. 7B are explanation views showing modified manners of the flexible isolating member 214. As a material for the flexible isolating member, a metal bellows can be selected from a reliability property, in particular a stainless steal bellows can be selected from an aspect of the anti-corrosion property.

A roughly sketched driving and supporting portion 205 is fixed with a welding manner at an end portion of the flexible isolating member 214. A finish end portion 217 of the flexible isolating member 214 is fixed another end portion of the flexible isolating member 214 with a welding manner and with the above stated manner the finish end portion 217 of the flexible isolating member 214 is installed to a swash plate (not shown).

At this time, in case where the upper end portion of the flexible isolating member 214 is installed to agree with the line B—B face, which has a relationship shown in FIG. 5, the center of the upper portion of the flexible isolating member 214 performs the inclined face revolving movement without the eccentricity, as shown in FIG. 7A.

This is always undesirable but as shown in FIG. 7B, it is desirable to perform the inclined face revolving movement being accompanied by the eccentric motion having an eccentric amount E.

At this time, the most optimization of the eccentric amount can determine by utilizing the relationship explained in FIG. 5 and FIG. 6.

Figure 8:
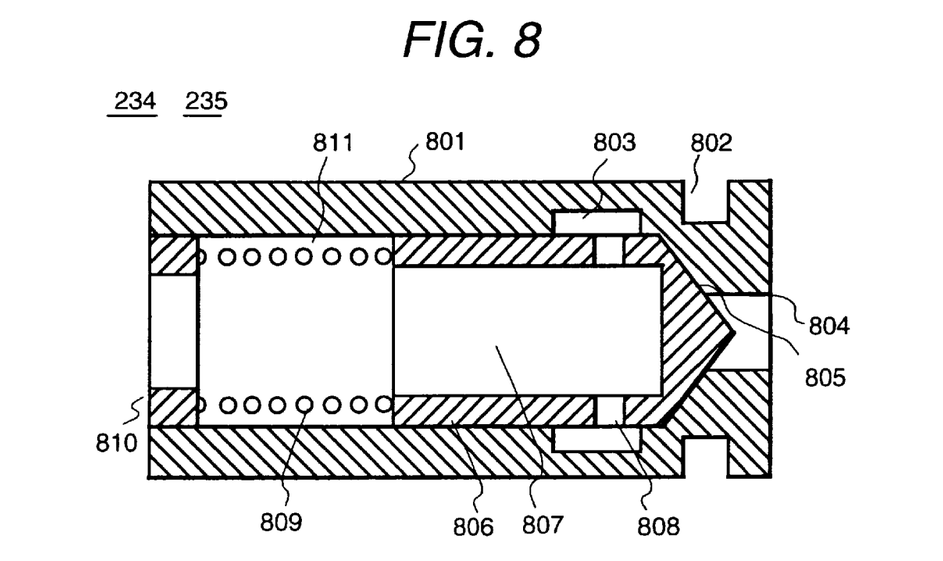
FIG. 8 is a cross-sectional view showing one embodiment of a check valve of the fuel pump of FIG. 2.

FIG. 8 is a cross-sectional view showing one embodiment of the check valve which is roughly explained.

The intake check valve 234 and the outlet check valve 235 basically adopt the same structure. A sealing groove 802 for installing a check valve sealing member 237 is provided on an outer peripheral portion of a valve outer cylinder 801.

A guide hole 811 is formed at a central portion of the valve outer cylinder 801 and a poppet valve 806 is held sliding in the guide hole 811.

A hole 804 is provided at a right end portion of the valve outer cylinder 801 and in succession to the hole 804 a seat portion 805 having a tapering shape is formed. An inner diameter enlarging portion is provided at a vicinity of the left end portion of the guide hole 811.

A right end portion of the poppet valve 806 is formed with a tapering shape and engages with the seat portion of the valve outer cylinder 801. A hollow portion 807 is formed at an interior portion of the poppet valve 806 and an escape hole 808 for communicating the hollow portion 807 and an outer face is provided.

A hollow spring fixing member 810 is inserted with pressure and in the left end portion of the guide hole 811 of the valve outer cylinder 801. A spring member 809 is fixed under spring state between the spring stop member 810 and the left end portion of the valve outer cylinder 806.

With the structure stated in above, since the poppet valve 806 is pushes to contact to the seat portion of the valve outer cylinder 801 under a suitable force and holds the sealing state, the poppet valve 806 operates to refuse the fuel flow against the pressure from the left side of the poppet valve 806.

When the pressure from the right side of the poppet valve 806 reaches to have a predetermined value, the force from the left side added to the poppet valve 806 is larger than the force obtained by the spring member 809 and the poppet valve 806 is moved toward the left side.

Therefore, the fuel flow is formed from the right side to the left side through a hole comprised of a tapered portion inner diameter enlargement portion 803, the escape hole 808 and the hollow portion 807.

Figure 9:
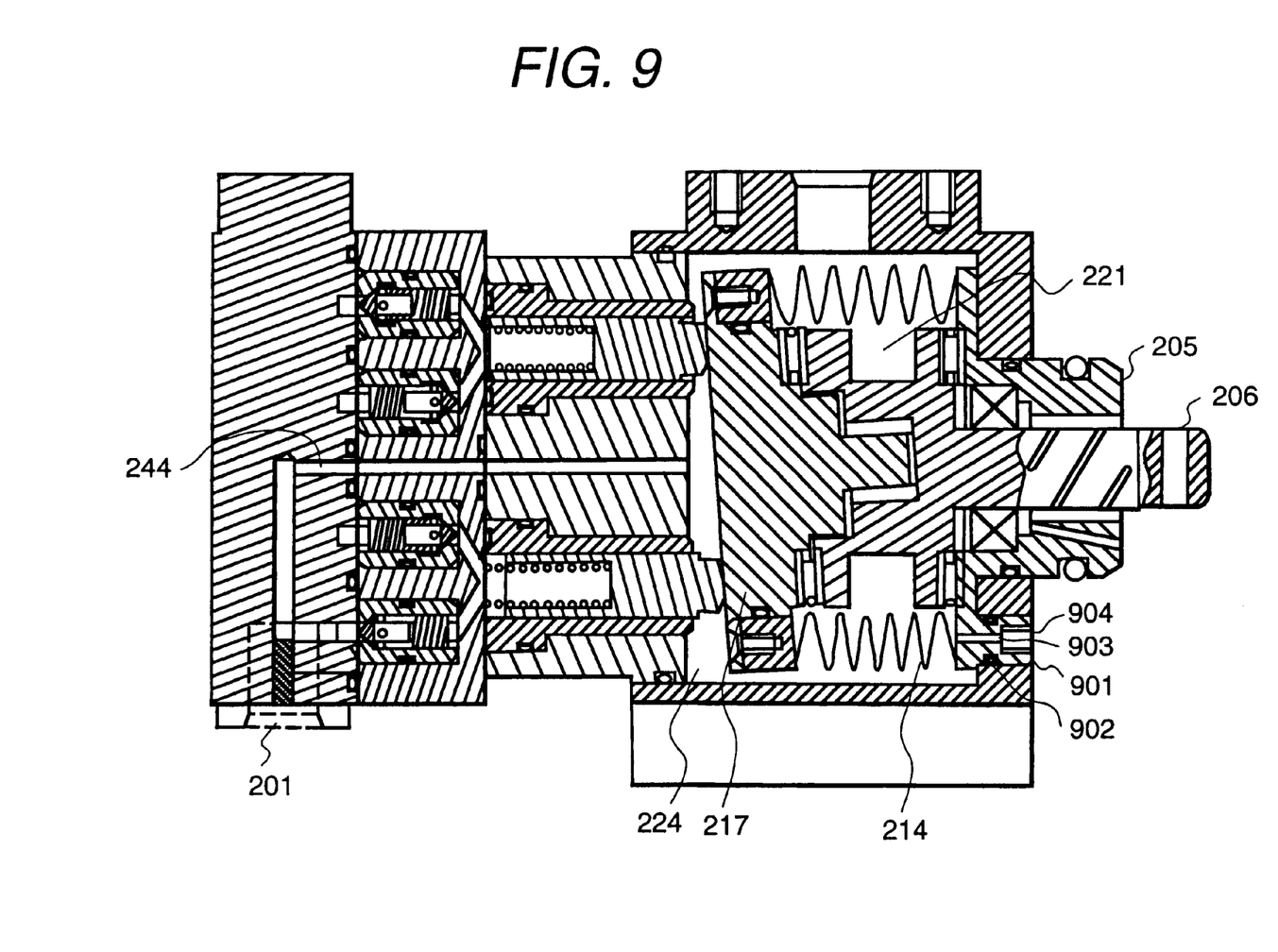
FIG. 9 is a cross-sectional view showing another embodiment of a fuel pump according to the present invention.

FIG. 9 is a cross-sectional view showing another embodiment of the fuel pump.

In FIG. 9, the reference number is indicated only parts different from the embodiment shown in FIG. 2 and the deleted components are omitted in FIG. 9.

First of all, a first different point is that the rotating motion preventing member is omitted in FIG. 9. In the fuel pump construction shown in FIG. 9, the rotation resisting force is heightened by increasing the thickness of the material of the flexible isolating member, for example, and so that this causes the effect of the component reduction is attained.

In a mechanism shown in FIG. 9, the fuel pressure acted on the plunger and the spring force in the plunger operate to a restraint force against the swash plate 218.

In this case, the relationship of the eccentric motion stated by using FIG. 5 does not change, and the above relationship is determined in accordance with an installing face of the bearing member and the position relationship of the flexible isolating member. Therefore, the eccentric motion amount can select voluntarily.

A second different point is that the orifice 245 is deleted. In this case, the fuel delivery is performed from a connection port side which is the fuel relief portion in the construction of FIG. 2, and fuel delivery is performed from the fuel delivery hole 244 through the intake hole 239. In this case, the fuel having the pressure exists in an outside of the flexible isolating section.

A third different point is that a projecting portion 901 is provided on a part of the driving and supporting portion 205 and this projecting portion 901 has a hole for communicating the flexible isolating section. By the projecting portion 901, the pump body and a sealing member 902 are engaged with under the sealing state.

With the structure in above, the lubricating agent can delivery to the sealing section and also the pressure detecting means in this section can connect. In case where the pressure at the outside of the flexible isolating member is higher than the pressure of the interior portion of the flexible isolating member, since the raise in pressure at the interior portion of the flexible isolating member is detected and judged, the failure or the abnormality in the flexible isolating member can detect.

The above facts can apply to hold the pressure of the interior portion of the flexible isolating member under the vacuum state during an initial period of a manufacturing period.

According to the present invention, by applying the present invention, a fuel pump such as a gasoline pump suitable for use in the in-cylinder direct injection system having a compact size and a small fluctuation can be provided.

In particular, the motion converting mechanism for converting the rotating motion to the axial inclined gyration moving of the swash plate is isolated from the other components by the flexible isolating member and the rotating motion converting mechanism does not contact to the fuel such as a gasoline.

Therefore, the problem about the lubrication for the load supporting portion in the rotating motion converting mechanism is solved. Further, since the sealing portion of the rotative shaft does not contact to the fuel such as a gasoline, the problem about the wear of the swash plate and the problem about the leakage of the lubricating oil can be released.

In case where the isolating section is filled up with the lubricating oil having the proper amount, since the contact of the lubricating oil with the fresh air is prevented, the inferior in the lubricating oil is prevented and the high reliability property fuel pump can be provided.

Since the part of the delivery fuel is made the low pressure and the this fuel is led to the connecting portion or the sliding portion between the swash plate and the plunger, the cooling in the connecting portion and the lubrication effect can be effected, the high reliability property fuel pump having the reduced wear property and the reduced friction force can be supplied.

Similarly to since the above stated fuel is led to the outside of the flexible isolating member, the cooling effect on the flexible isolating member and lubricating oil in the interior portion of the rotating motion converting mechanism are obtained. Therefore, the high reliability property fuel pump can be supplied.

Since the intake check valve and the outlet check valve are radially arranged by fitting to the number of the cylinders and the outlet check valves are arranged at the inner peripheral portion, the pull apart force in the pump axial direction due to the reaction force of the high pressure fuel can be reduced. Therefore, the compact size and the high reliability property fuel pump can be realized.

Since the rotating motion preventing member for positively preventing the rotating motion of the swash plate is provided, the rotation force acted on the flexible isolating member is dissolved and the stress acted on the flexible isolating member is mitigated. Therefore, the high reliability property fuel pump can be provided.

In case where the delivery fuel having the pressure is led from the outside of the flexible isolating member to the intake side of the intake check valve through the fuel pump, the fuel relief portion is unnecessary. Therefore, the piping structure of the fuel pump can be simplified.

Since the gyration moving eccentric amount of the end portion of the flexible isolating member is suitably selected by fitting to the property of the flexible isolating member, the stress easing acted on the flexible isolating member is attained. Therefore, the high reliability property fuel pump can be provided.

Since the connecting portion for observing the pressure in the interior portion of the flexible isolating member is provided, the damage and the abnormality of the flexible isolating member can be detected. Therefore, the safety vehicle having the fuel pump according to the present invention can be realized. According to the above stated embodiments of the fuel pump according to the present invention, the swash plate 218 is provided on the interior portion the body 204 and is fixedly mounted on one end of the rotating shaft 206. The rotating motion converting mechanism converts the rotating motion of the rotating shaft 206 to the inclined gyration moving of the swash plate 218.

The pump mechanism portion is provided on the opening portion of the body 204 and is opposite arranged to the swash plate 218. The pump mechanism portion has plural pistons which comprises the sleeves 225 and the plungers 228. Each of plural pistons slides and contacts to the swash plate 218.

The flexible isolating member 214 is provided in the interior portion of the body 204. One end of the flexible isolating member 214 is fixedly mounted on the swash plate 208 and other end of the flexible isolating member 214 is fixedly mounted on the body 204.

The fuel relief section 224 is isolated by the flexible isolating member 214 and receives the gasoline as the fuel which is pressurized according to the axial direction motion by the swash plate 218. The fuel relief section 224 includes at least the different normal direction face of the swath plate 218.

The isolating section 221 is adjacently provided on the fuel relief section 224 and is isolated by the flexible isolating member 214. This isolating section 221 receives the lubricating oil and includes the rotating motion converting mechanism.

Figure 10:
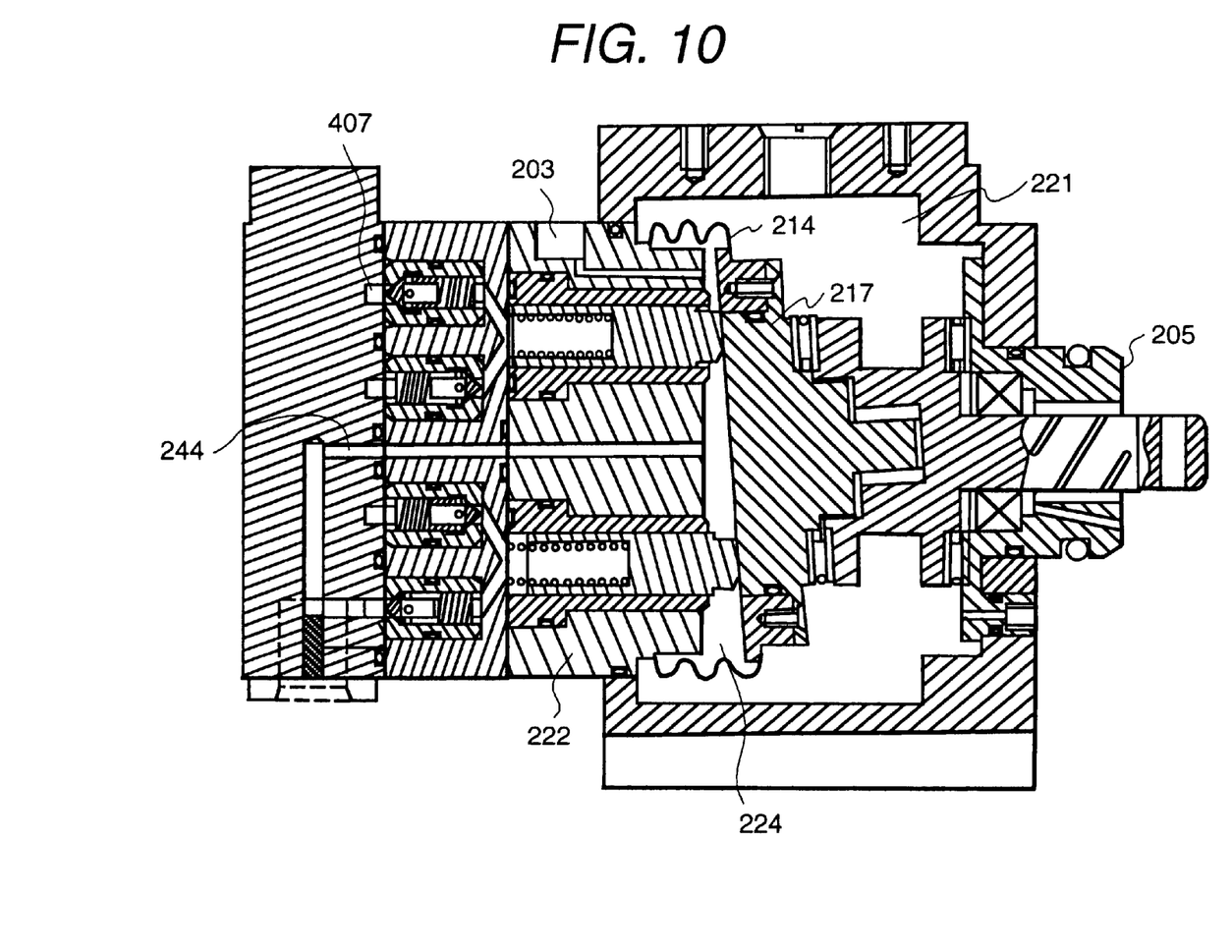
FIG. 10 is a cross-sectional view showing a further embodiment of a fuel pump according to the present invention.

FIG. 10 is a cross-sectional view showing a further embodiment of a fuel pump according to the present invention.

In FIG. 10, one end of the flexible isolating member 214 is fixedly mounted of the swash plate 218 and the other end of the flexible isolating member 214 is fixedly mounted on the pressurizing body 222 of the pump mechanism.

In this embodiment of the fuel pump according to the present invention, the isolating section 221 and the fuel relief section 224 are separately formed by the flexible isolating member 214.

The isolating section 221 includes the rotating motion converting mechanism and receives the lubricating oil therein. The fuel relief section 224 includes at least different normal direction face of the swash plate 217 and receives the gasoline therein.

In this embodiment, the gasoline as the fuel is delivered from the fuel delivery hole 244 and passes through the fuel relief section 224 and after that the gasoline flows out the orifice 203.

The gasoline is delivered from the fuel delivery hole 244 and passes through the fuel delivery horizontal hole 408 and the fuel outlet circular groove 407. After that the fuel is led into the injector of the engine.

In this embodiment of the fuel pump, the gasoline as the fuel is included in the fuel relief section 224. The fuel is shielded by the flexible isolating member 214 but does not flow toward the side of the isolating section 221. The lubricating oil is included in the isolating section 221. The lubricating oil lubricates the bearing portion and the sealing portion of the rotating motion converting mechanism.

In this embodiment of the fuel pump according to the present invention, the flexible isolating member 214 is provided in the interior portion of the body 204. One end of the flexible isolating member 217 is fixedly mounted on the swash plate 218 and other end of the flexible isolating member 217 is fixedly mounted on the pressurizing body 222 of the pump mechanism portion.

The fuel relief section 224 is isolated by the flexible isolating member 217 and receives the gasoline as the gasoline. The isolating section 221 is adjacently provided on the fuel relief section 224 and is isolated by the flexible isolating member 217. The isolating section 221 receives the lubricating oil and includes the rotating motion converting mechanism.

What is claimed is:

1. A fuel pump for use in an internal combustion engine, comprising:

a rotating shaft driven by rotation of the internal combustion engine;

a fuel pressurizing mechanism having a plunger and a cylinder for pressurizing fuel in said fuel pressurizing mechanism;

a movable plate for reciprocating said plunger of said pressurizing mechanism by synchronizing the rotation of the internal combustion engine in an axial direction motion component of said plate;

the fuel is pressurized and compressed by a reciprocating movement of said plunger of said pressurizing mechanism; and a single impermeable flexible isolating member mounted on said movable plate to isolate the fuel in said fuel pressurizing mechanism;

whereby the fuel is prevented from leaking from a side of said pressurizing mechanism to side of said plate by said single impermeable flexible isolating member.

2. A fuel pump for use in an internal combustion engine, comprising:

a rotating shaft driven by rotation of the internal combustion engine;

a fuel pressurizing mechanism having a plunger and a cylinder for pressurizing fuel in said fuel pressurizing mechanism;

a spring slidably received in the cylinder so as to bias the plunger out of the cylinder;

a rotation motion mechanism comprising a wobble plate for reciprocating said plunger of said pressurizing mechanism by synchronizing the rotation of the internal combustion engine in an axial direction motion component of said rotation motion mechanism, the fuel being pressurized and compressed by a reciprocating movement of the plunger; and a single impermeable flexible isolating member having one end thereof mounted at said wobble plate to isolate the fuel in said fuel pressurizing mechanism;

whereby the fuel is prevented from leaking from a side of said pressurizing mechanism to side of said rotation motion mechanism by said single impermeable flexible isolating member.

* * * * *